(12) United States Patent
Lyles

(10) Patent No.: US 6,880,093 B1
(45) Date of Patent: Apr. 12, 2005

(54) LOW POWER COMMUNICATION DEVICE

(75) Inventor: Joseph Bryan Lyles, Mountain View, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 512 days.

(21) Appl. No.: 09/920,487

(22) Filed: Aug. 1, 2001

(51) Int. Cl.[7] .................................................. G06F 1/26
(52) U.S. Cl. ...................................... 713/300; 714/100
(58) Field of Search ................................. 713/320, 340, 713/300; 379/413; 455/574

(56) References Cited

U.S. PATENT DOCUMENTS

| | | | | |
|---|---|---|---|---|
| 5,241,591 A | * | 8/1993 | Saji ............................. | 379/361 |
| 5,283,905 A | * | 2/1994 | Saadeh et al. ............... | 713/324 |
| 6,240,521 B1 | * | 5/2001 | Barber et al. ................ | 713/323 |
| 6,314,308 B1 | * | 11/2001 | Sheynblat et al. .......... | 455/574 |
| 6,625,281 B1 | * | 9/2003 | Bernard ...................... | 379/413 |

* cited by examiner

*Primary Examiner*—Thomas Lee
*Assistant Examiner*—Vajirachai Komol

(57) ABSTRACT

A communication device for exchanging communication between user devices and a communication network reduces power consumption after detecting a low power condition. The communication device advantageously operates during a power outage when a power supply for the communication device fails. The communication device includes a network interface, a power control circuitry, and a processor. The network interface exchanges digital communication signals with the communication network. The power control circuitry detects a low power condition. The power control circuitry then generates a power control signal in response to the low power condition. The processor exchanges first communication signals between the network interface and an analog telephone interface or a digital computer interface. The processor receives and processes the power control signal to lower power consumption of the communication device.

17 Claims, 7 Drawing Sheets

LOW POWER COMMUNICATION DEVICE

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of telecommunications, and in particular, to a communication device that decreases power usage when power is low.

2. Description of the Prior Art

Telephones lines carry electricity to power certain types of telephones. Therefore, during a power outage, people can still use their telephones by using the electricity over the telephone lines. The power supplied over the telephone lines is approximately 1.5 watts. Currently, telecommunication companies offer a variety of telecommunication services besides just telephony service. These telecommunication services, such as on-demand digital video, e-mail, and web access, continually increase demand for higher speed data transfer.

One telecommunication service is Digital Subscriber Loop (DSL) service. FIG. 1 depicts a block diagram of a Digital Subscriber Loop system in the prior art. In a power outage at the residence 160, the phone 180 still has power over the telephone line 152 to operate. The analog telephony signal is carried over the telephone line 152.

In another prior art system, the DSL service is provided through a communication device that is attached to telephones, fax machines, and computers. FIG. 2 depicts a block diagram of a Digital Subscriber Loop system with a communication device in the prior art. The communication device 270 exchanges telecommunication services between communication networks such as the Internet 210 and the phone network 230 and user devices such as telephones 280 and computers 290. FIG. 3 shows the residence in greater detail.

FIG. 3 depicts a block diagram of a user' residence 300 in the prior art. The residence 300 includes a communication device 310, a telephone 370, a telephone 372, a telephone 374, a facsimile machine 376, and a computer 378. The communication device 310 comprises a Digital Subscriber Line (DSL) interface 320, a telephone line 324, an AC power supply 330, a DC power supply 340, a processor 350, an analog telephone interface 362 and a digital computer interface 364, and a bus 380.

The analog telephone interface 362 exchanges telephony communications between the telephones/facsimile machine 370–376 and the processor 350 via the bus 380. The digital computer interface 364 exchanges data communications between the computer 378 and the processor 350 via the bus 380. The processor 350 exchanges communications between the DSL interface 320 and the bus 380. The DSL interface 320 then converts the communication from and to DSL formats between the processor 350 and the telephone line 324. The telephone line 324 is connected to a network provider not pictured. The bus 380 may be delineated to different lines to carry different types of traffic but is pictured as one bus line for the sake of simplicity.

Under normal operating conditions, the AC power supply 330 provides the power to the communication device 110. When the AC power supply 330 fails due to various conditions such as a power outage, the DC power supply 340 provides the power to the communication device 110. One problem is the DC power supply 340 which typically includes batteries only has a limited amount of power. Thus, the communication device 310 shuts down after a limited time when the DC power supply 340 dies.

One problem is the user cannot use a telephone connected to the communication device 3 10 during a power outage and after the DC power has been consumed. Another problem is the communication device 310 needs more than the 1.5 watts provided over the telephone line 324. One example of the processor 350 is Motorola's MPC8260, a very highly integrated communication-oriented processor that consumes 2.5 watts. Those skilled in the art will appreciate that there are other suitable choices for the processor 350. The DSL interface 322 typically consumes 1 watt. Thus, the communication device 310 consumes more than the 1.5 watts provided over the telephone line 324.

SUMMARY OF THE INVENTION

The invention solves the above problems by detecting a low power condition and generating a power control signal that reduces the power consumption of a communication device. The communication device includes a network interface, a power control circuitry, and a first processor. The network interface exchanges digital communication signals with the communication network. The power control circuitry detects a low power condition. The power control circuitry then generates a power control signal in response to the low power condition. The first processor exchanges first communication signals between the network interface and an analog telephone interface or a digital computer interface. The first processor receives and processes the power control signal to lower power consumption of the communication device.

In one embodiment, the first processor transfers control to a second processor based on the power control signal. The second processor has a lower power consumption than the first processor. In one embodiment, the second processor has a lower power consumption by using a lower processing speed. In another embodiment, the first processor changes a power mode of the first processor to a power mode with a lower power consumption. This power mode with a lower power consumption may have a lower processing speed. In yet another embodiment, computer lines and all telephone lines except one emergency line are powered down.

The communication device advantageously operates during a power outage when a power supply for the communication device fails. In some embodiments, the communication device consumes less power by reducing the processing speed. In one embodiment, during a power outage, the communication system is powered by a network link that provides 1.5 watts. The communication device reduces the power consumption by powering down telephone lines based on the power control signal. Also, the communication device powers down the digital computer interface because the computer has no power during a power outage.

BRIEF DESCRIPTION OF THE DRAWINGS

The same reference number represents the same element on all drawings.

DETAILED DESCRIPTION OF THE INVENTION

Figure 1:
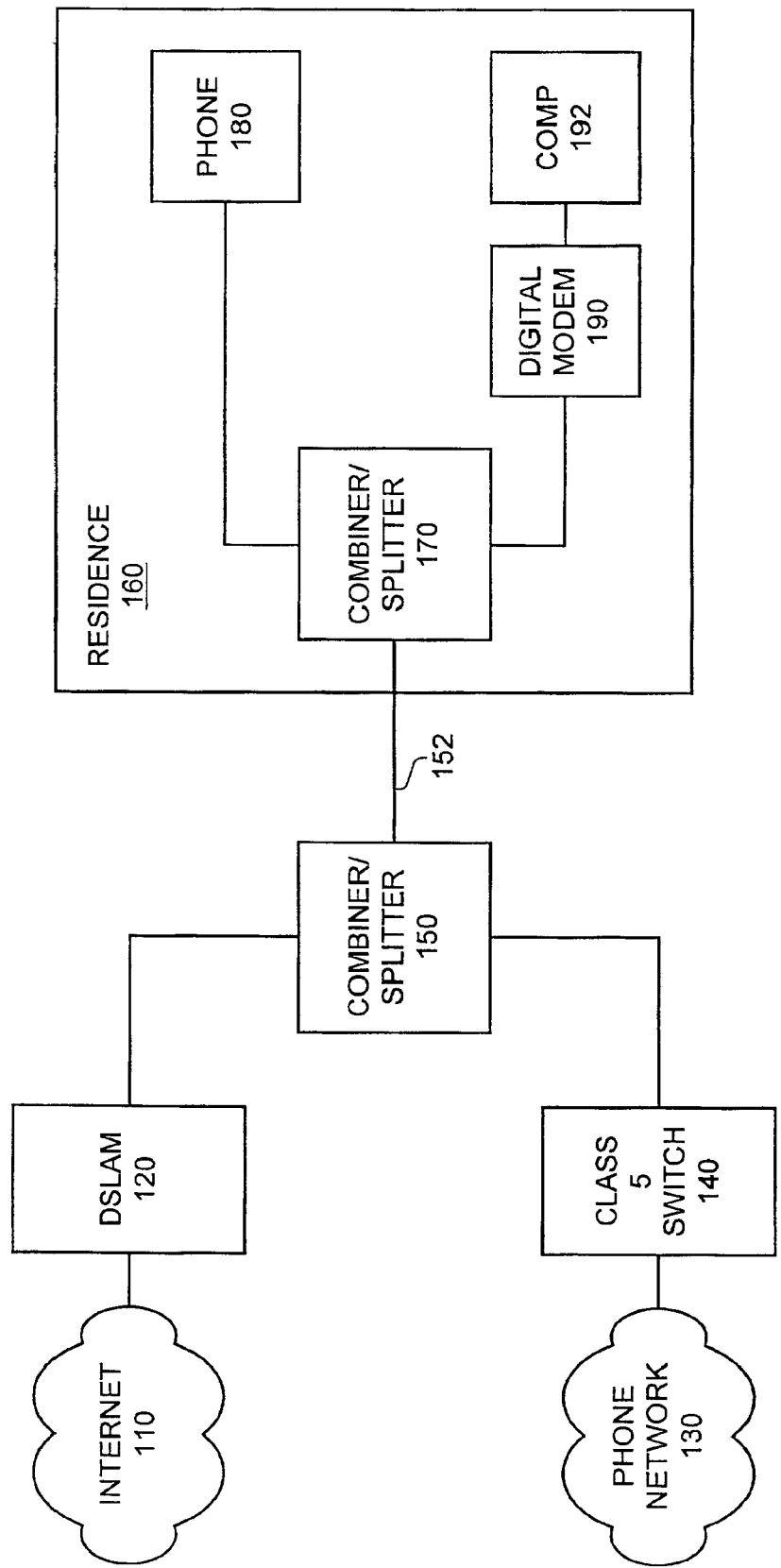
FIG. 1 is a block diagram of a Digital Subscriber Loop system in the prior art.
Figure 2:
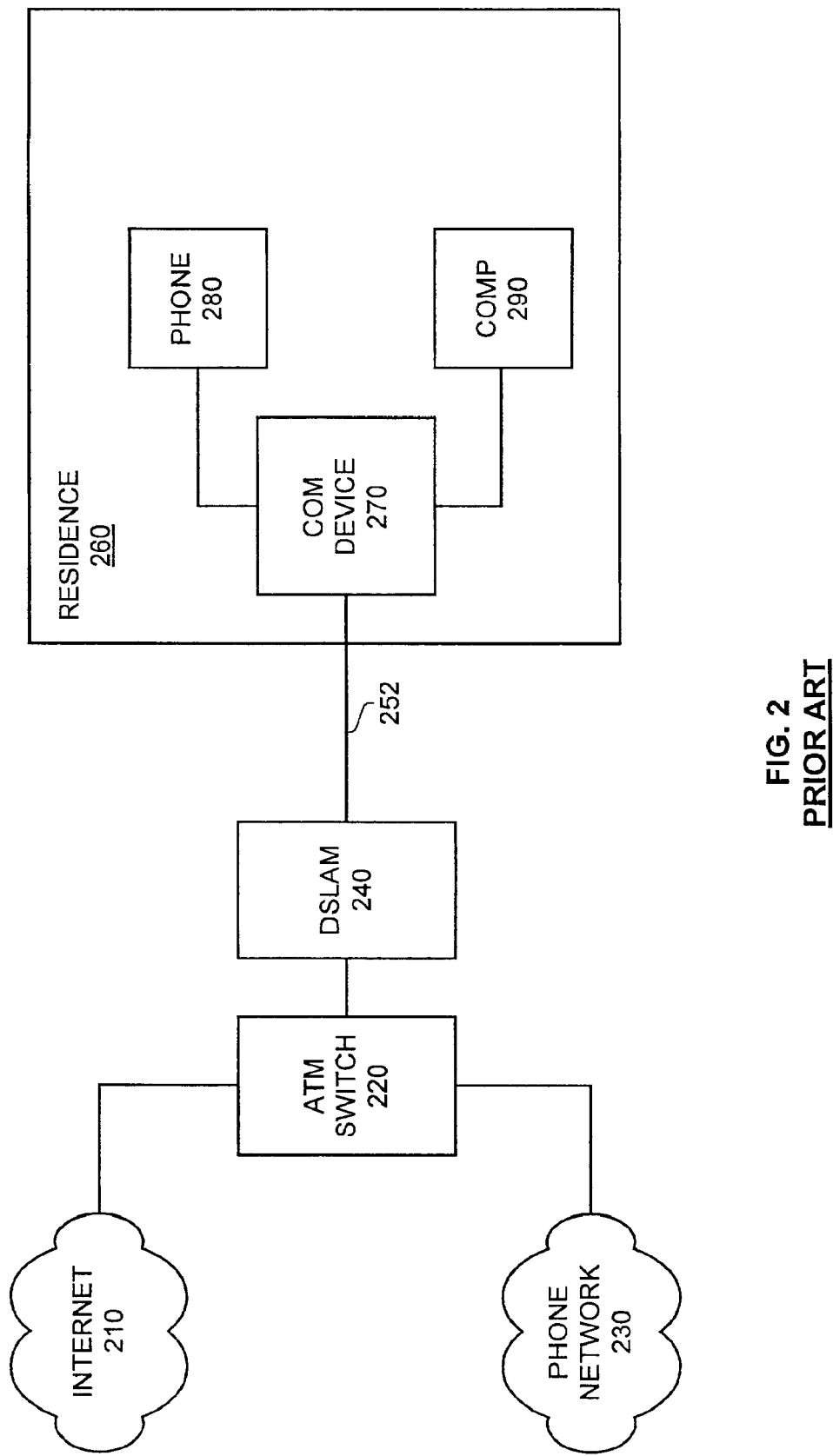
FIG. 2 is a block diagram of a Digital Subscriber Loop system with a communication device in the prior art.
Figure 3:
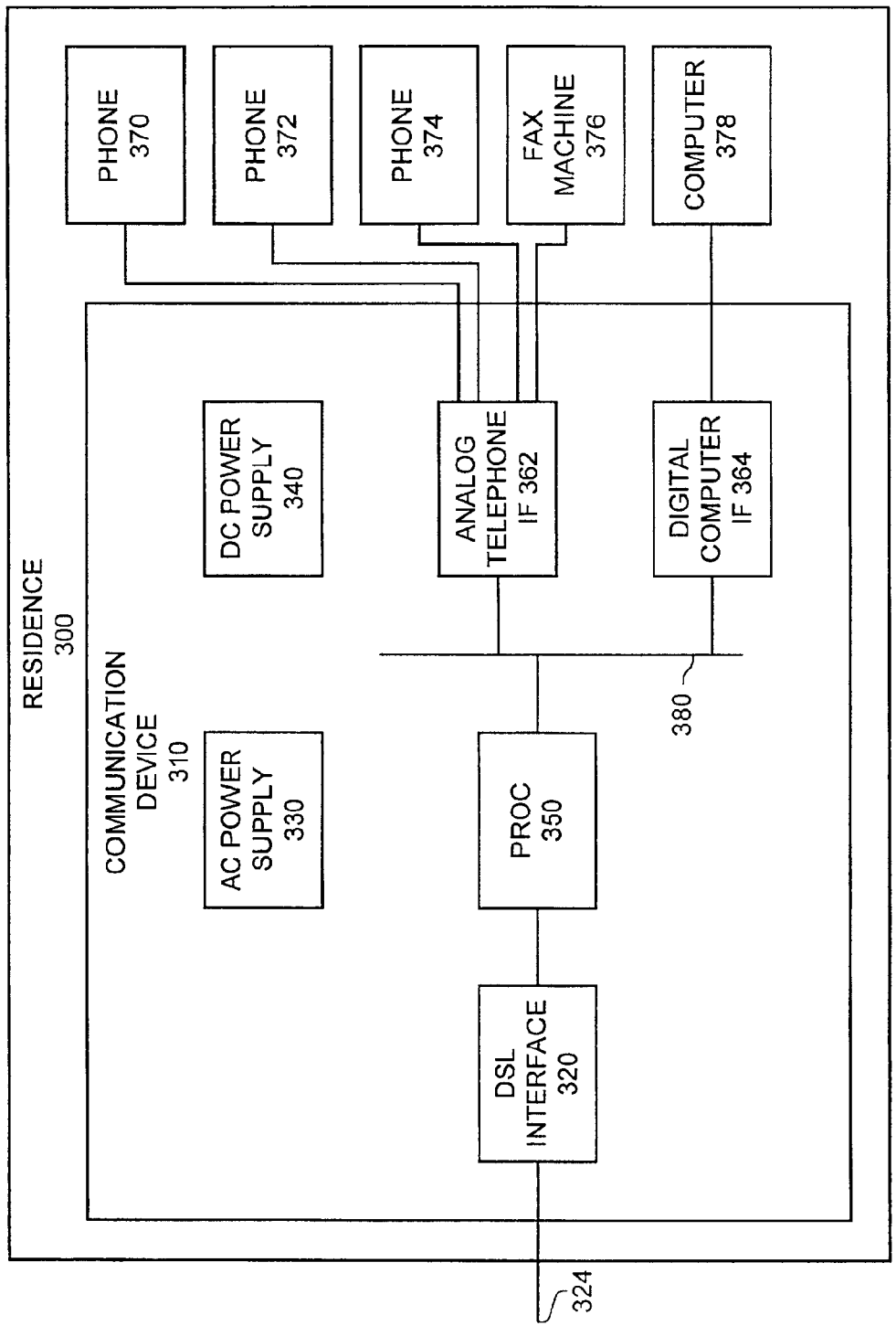
FIG. 3 is a block diagram of a user's residence in the prior art.
Figure 4:
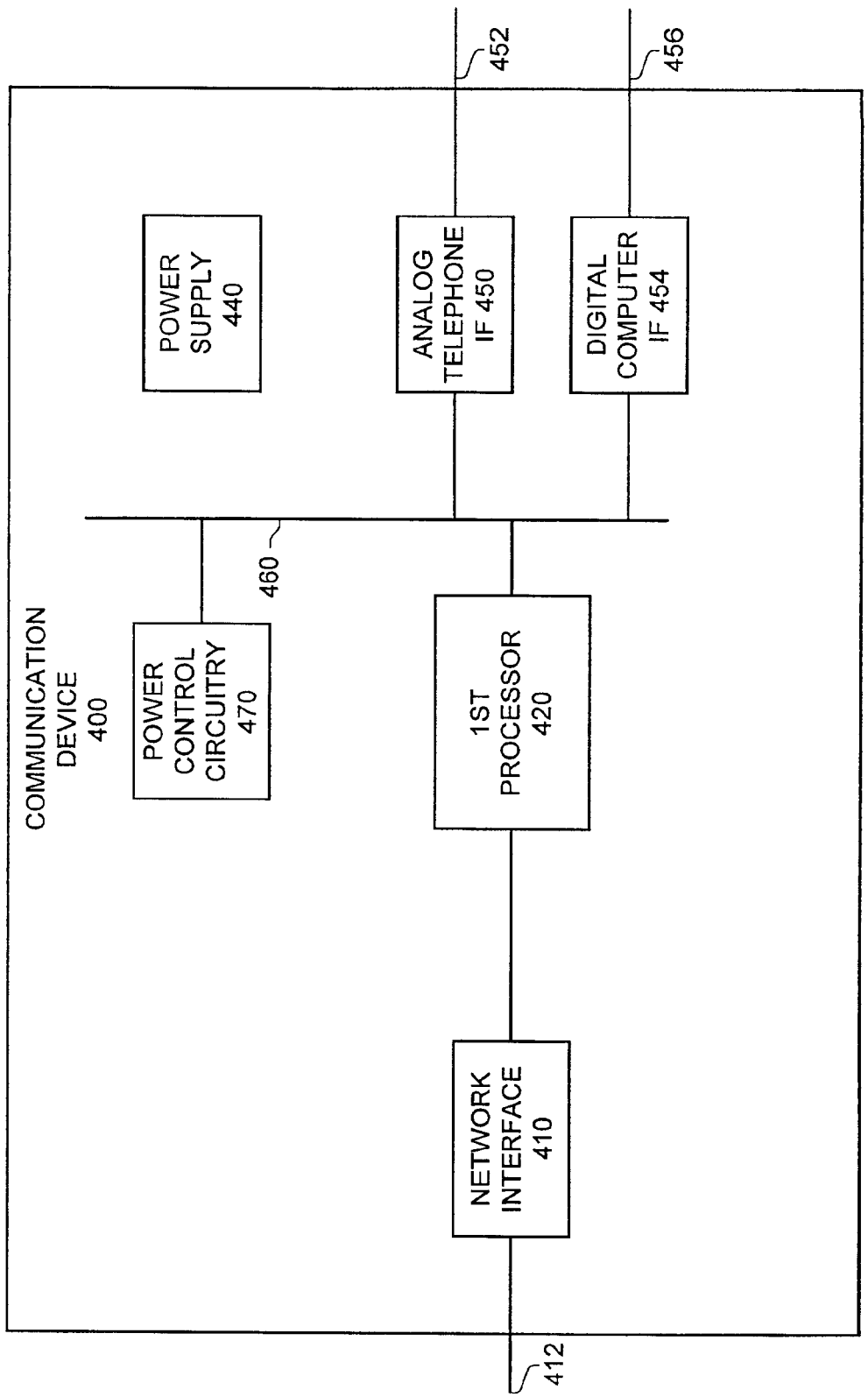
FIG. 4 is a block diagram of a communication device in an example of the invention.
Figure 5:
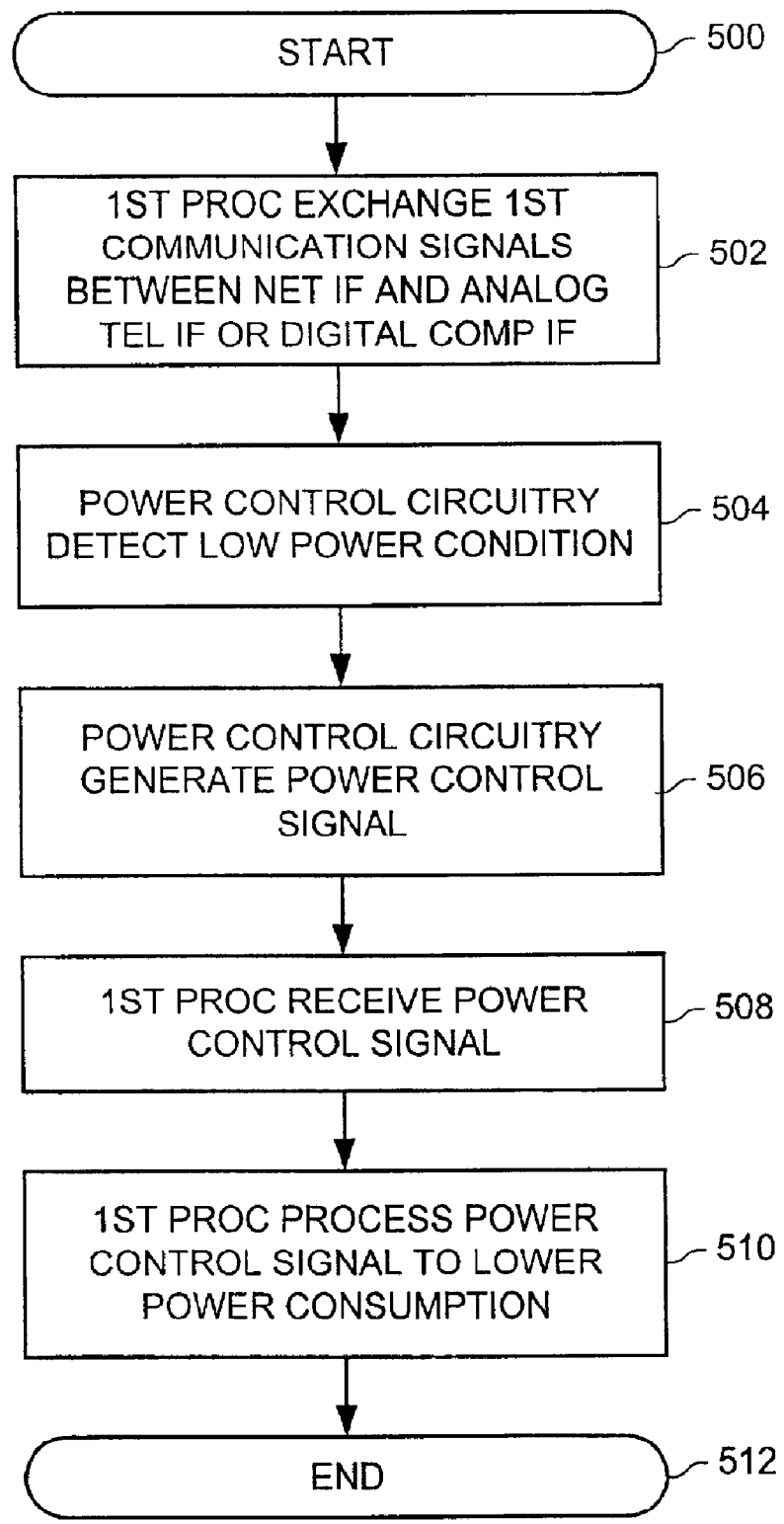
FIG. 5 is a flowchart of the operation of a communication device in an example of the invention.

Communication Device—FIGS. 4–5

FIG. 4 depicts a block diagram of a communication device 400 in an example of the invention. The communication device 400 resides in a residence or a place of business. The communication device 400 exchanges digital communications between a communication network and user devices such as a computer, telephone, television, or facsimile machine. The communication device 400 comprises a network interface 410, a first processor 420, a power supply 440, an analog telephone interface 450, a digital computer interface 454, a bus 460, and a power control circuitry 470.

A network link 412 is connected to the network interface 410. The network interface 410 is connected to the first processor 420. The first processor 420 is connected to the bus 460. The bus 460 is connected to the analog telephone interface 450, the digital computer interface 454, and the power control circuitry 470. The analog telephone interface 450 is connected to the telephone link 452. The digital computer interface 454 is connected to the computer link 456. The bus 460 may be delineated to different lines to carry different types of traffic and the power but is pictured as one bus line for the sake of simplicity.

The power control circuitry 470 could be any circuitry configured to detect a low power condition and generate a power control signal in response to the low power condition. A low power condition is any condition that indicates power is low in the communication device 400. One example of a low power condition is a condition where an AC and DC power supply fails and power is provided through a telephone line at 1.5 watts. A power control signal is any signal that the power control circuitry 470 generates based on the low power condition to reduce the overall power consumption of the communication system 400.

The first processor 420 could be any processor configured to (1) exchange first digital communication signals between the network interface 410 and the analog telephone interface 450 or the digital computer interface 454, (2) receive a power control signal, (3) and process the power control signal to lower power consumption of the communication device 400. Those skilled in the art will understand that the operation of the power control circuitry 470 may be included within the operation of the first processor 420. Power consumption is the amount of power that the communication device 400 consumes. In one embodiment, the first processor 420 transfers control to a second processor with a lower power consumption that the first processor 420. In yet another embodiment, the first processor 420 switches to a lower power consumption mode with a lower processing speed.

The network link 412 could be any link that connects a communication network with the communication device 400. Some examples of the communication networks are the Internet and Public Switched Telephone Networks. Some examples of the network link 412 are telephones lines and Digital Subscriber Loop (DSL) lines.

The network interface 410 could be any interface that exchanges digital communication signals with the communication networks via the network link 412. One example of the network interface 410 is a DSL interface. The analog telephone interface 450 could be any interface that exchange first communication signals between the telephone link 452 and the first processor 420. One example of the analog telephone interface 450 is a Plain Old Telephone Service interface. The digital computer interface 454 could be any interface that exchanges first communication signals between the computer link 412 and the first processor 420. One example of the digital computer interface 454 is an Ethernet interface.

FIG. 5 depicts a flowchart of the operation of the communication device 400 in an example of the invention. FIG. 5 begins in step 500. The network interface 410 exchanges digital communication signals with the communication network. In step 502, the first processor 420 exchanges first communication signals between the network interface 410 and the analog telephone interface 450 or the digital computer interface 454. When the power for the communication device 400 is low, the power control circuitry 470 detects a low power condition in step 504. The power control circuitry 470 then generates a power control signal based on the low power condition in step 506. The first processor 420 then receives the power control signal in step 508. The first processor 420 processes the power control signal to lower power consumption of the communication device 400 in step 510. FIG. 5 ends in step 512.

Figure 6:
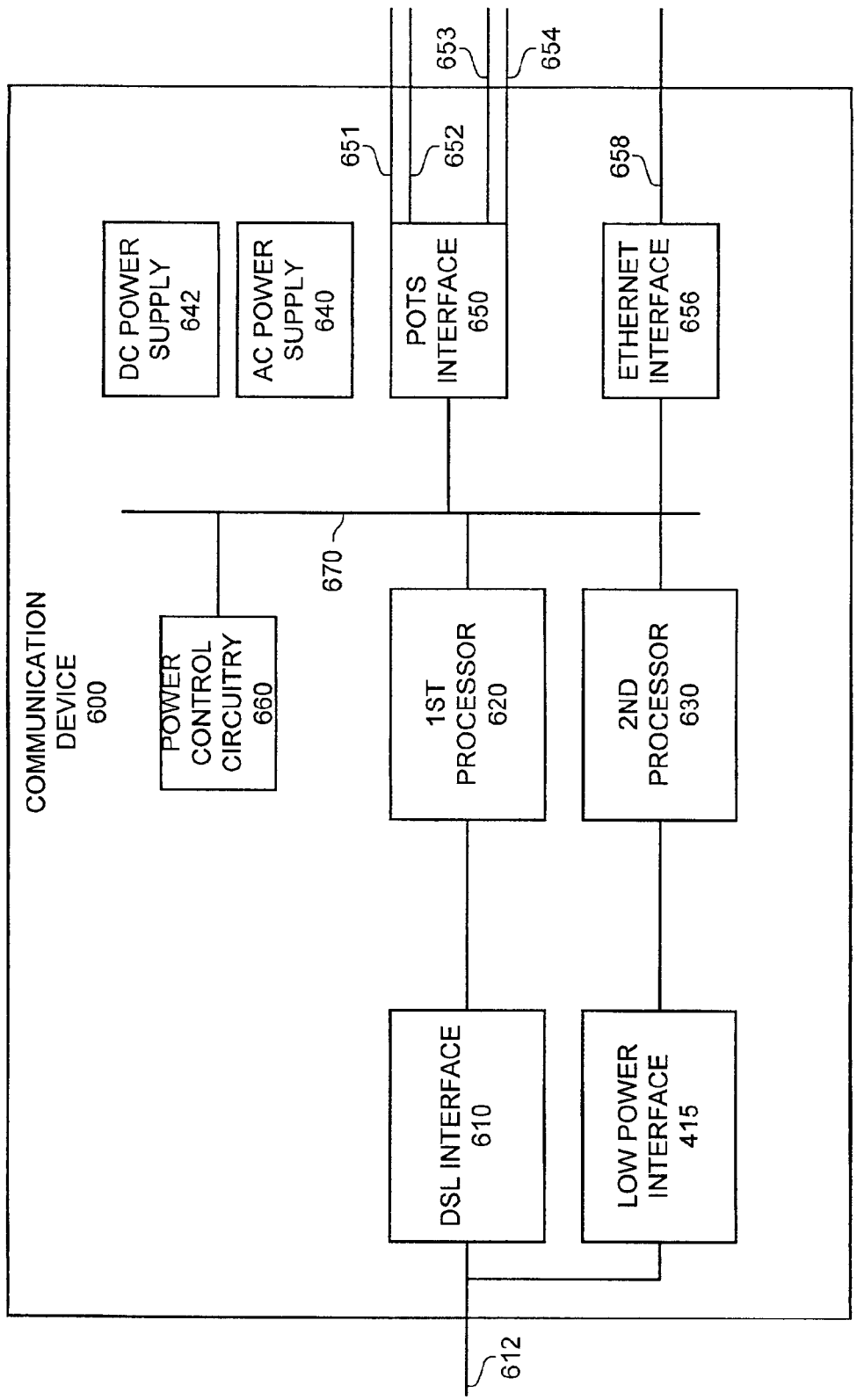
FIG. 6 is a block diagram of a communication device with a DSL interface in an example of the invention.
Figure 7:
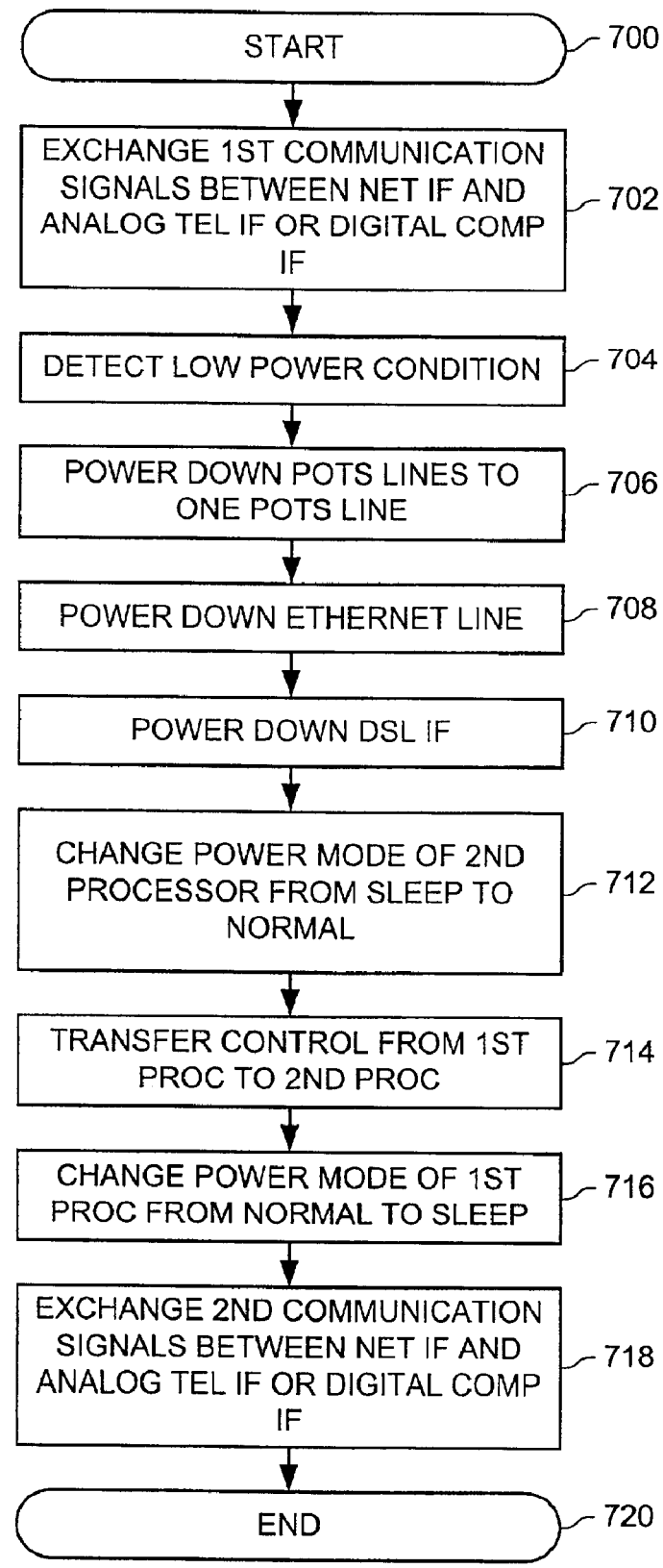
FIG. 7 is a flowchart of the operation of a communication device with a DSL interface in an example of the invention.

Communication Device with DSL Interface—FIGS. 6–7

FIGS. 6–7 disclose one embodiment of the invention, but the invention is not restricted to the configuration provided below. Those skilled in the art will appreciate numerous variations in a communication device and operation that are within the scope of the invention. Those skilled in the art will also appreciate how the principles illustrated in this example can be used in other examples of the invention. A particular reference number in one figure refers to the same element in all of the other figures.

FIG. 6 depicts a block diagram of a communication device 600 with a Digital Subscriber Line (DSL) interface 610 in an example of the invention. The communication device 600 comprises the DSL interface 610, a low power interface 615, a first processor 620, a second processor 630, an AC power supply 640, a DC power supply 642, a Plain Old Telephone Service (POTS) interface 650, an Ethernet interface 656, a bus 670, and a power control circuitry 660.

A network line 612 is connected to the DSL interface 610 and the low power interface 615. The DSL interface 610 is connected to the first processor 620. The low power interface 615 is connected to the second processor 630. The first processor 620 and the second processor 630 are connected to the bus 670. The bus 670 is connected to the the POTS interface 650, the Ethernet interface 656, and the power control circuitry 660. The POTS interface 650 is connected to the telephone link 651, the telephone link 652, the telephone link 653, and the telephone link 654. The Ethernet interface 656 is connected to the computer link 658. The bus 670 may be delineated to different lines to carry different types of traffic but is pictured as one bus line for the sake of simplicity.

In this embodiment, the first processor 620 is a Motorola's MPC8260, which consumes 2.5 watts. The second processor 630 is an Intel StrongArm processor SA-1110 that consumes less than 240 mW in normal mode. The SA-1110 also has an idle mode and a sleep mode that consumes less power than the normal mode. In another embodiment, a V.32 modem is implemented in the software running on the second processor 620, a Strong Arm processor. This enables both the processing function and the interface function to be implemented at a power cost of less than one half watt. Those skilled in the art will recognize that the Strong Arm processor may be suitable for the first processor 620 and the second processor 630. The low power interface 615 is a modem chip configured to support 32Kb/s for voice communications.

In a power outage, additional telephone lines for multiple phones are unnecessary. Also, digital computer connections to computers are unnecessary because the computer has no power. Only one telephone line is needed during a power outage. By switching to a lower power processor and powering down unneeded telephone lines and computer interfaces, the communication device 600 consumes less than 1.5 watts, which is provided through the network line 612.

FIG. 7 depicts a flowchart of the operation of the communication device 600 with a DSL interface 610 in an example of the invention. FIG. 7 begins in step 700. In step 702, the first processor 620 exchanges first communication signals between the network interface 610 and the POTS interface 650 or the Ethernet interface 656. When the AC power supply 640 and the DC power supply 642 fail, the communication system 600 uses the power from the network link 612, which is 1.5 watts. The power from the network link 612 is reliable backup power available at the central office of the telecommunications provider. The power control circuitry 660 then detects a low power condition in step 704. The power control circuitry 660 then generates a power control signal based on the low power condition.

In step 706, the POTS interface 650 powers down the telephone links 652–654 leaving only one telephone line operational based on the power control signal. In step 708, the Ethernet interface 654 powers down based on the power control signal. In step 710, the first processor 620 powers down the DSL interface 610 and powers up the low power interface 615 such as a modem chip that supports the 32Kb/s voice communication based on the power control signal. 32Kb/s is the minimum threshold for supporting voice communications. By powering down the DSL interface, power is saved by reducing the amount of digital signal processing. In another embodiment, the first processor 620 modifies the DSL interface 610 to change the rate to 32Kb/s without powering up a secondary low power interface 615. The second processor 630 changes power modes from a sleep mode to normal mode based on the power control signal in step 712.

The first processor 620 then transfers control to the second processor 630 based on the power control signal in step 714. Transferring control may include transferring instructions to be executed by the first processor 620 or transferring temporary data stored or cached by the first processor 620. The first processor 620 then changes power modes from a normal mode to a sleep mode based on the power control signal in step 716. The second processor 630 then exchanges second communication signals between the DSL interface 610 and the POTS interface 650 or the Ethernet interface 654. FIG. 7 ends in step 720.

Once the power is resumed from the AC power supply 640 or the DC power supply 642, the power control circuitry 660 detects a high power condition and generates a high power signal. A high power condition is any condition that indicates power is high in the communication device 600 due to power from a power supply. A high power signal is any signal that the power control circuitry 660 generates based on the high power condition to increase the overall power consumption of the communication system 600. The steps in FIG. 7 are reversed to power up all telephone links, power up the Ethernet interface 656, transfer control from the second processor to the first processor, and increase the transfer rate of the DSL interface 610. In another embodiment, the power control circuitry 660 is included within the operation of the first processor 620 and the second processor 630.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. Those skilled in the art are familiar with instructions, processor, and storage media.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A device comprising:
a network interface configured to exchange communications with a communication network;
a plurality of interfaces configured to exchange communications with a plurality of user devices;
a power supply configured to draw power from a power source external to the device or from the communication network;
power control circuitry configured to detect a loss of power from the power source external to the device;
a first processor connected to the power control circuitry and configured to switch the power supply from the power source external to the device to the communications network when the loss of power is detected;
the processor also configured to switch to a low power mode by lowering the power consumption of the device when the loss of power is detected where the power consumption of the device is lowered by witching control of the device from the first processor to a second processor having a lower power consumption than the first processor.

2. The device of claim 1 where the network interface is a digital subscriber line interface.

3. The device of claim 1 where a first one of the plurality of interfaces is an analog telephone interface and where a second one of the plurality of interfaces is a digital computer interface.

4. The device of claim 1 where the power control circuitry is configured to detect a restoration of power from the power source external to the device and the processor is configured to switch from the low power mode to a normal power mode when the restoration of power is detected.

5. The device of claim 1 where the power source external to the device is an AC circuit.

6. The device of claim 1 where the power supplied from the communication network is power supplied by a phone line.

7. A device comprising:

a network interface configured to exchange communications with a communication network;

a plurality of interfaces configured to exchange communications with a plurality of user devices;

a power supply configured to draw power from a power source external to the device or from the communication network;

power control circuitry configured to detect a loss of power from the power source external to the device;

a first processor connected to the power control circuitry and configured to switch the power supply from the power source external to the device to the communications network when the loss of power is detected;

the processor also configured to switch to a low power mode by lowering the power consumption of the device when the loss of power is detected where the power consumption of the device is lowered by disabling at least one of the plurality of interfaces.

8. A device comprising:

a network interface configured to exchange communications with a communication network;

a plurality of interfaces configured to exchange communications with a plurality of user devices;

a power supply configured to draw power from a power source external to the device or from the communication network;

power control circuitry configured to detect a loss of power from the power source external to the device;

a first processor connected to the power control circuitry and configured to switch the power supply from the power source external to the device to the communications network when the loss of power is detected;

the processor also configured to switch to a low power mode by lowering the power consumption of the device when the loss of power is detected where the power consumption of the device is lowered by switching the first processor to a lower power consumption mode where the lower power consumption mode is a slower clock rate.

9. A device comprising:

a network interface configured to exchange communications with a communication network;

a plurality of interfaces configured to exchange communications with a plurality of user devices;

a power supply configured to draw power from a power source external to the device or from the communication network;

power control circuitry configured to detect a loss of power from the power source external to the device;

a first processor connected to the power control circuitry and configured to switch the power supply from the power source external to the device to the communications network when the loss of power is detected;

the processor also configured to switch to a low power mode by lowering the power where the power consumption of the deice is lowered by lowering the transmission rate of the network interface.

10. A method comprising:

powering a device, in a normal power mode, from a power source external to the device when the external source has power available;

powering the device, in a low power mode, from the power available in a phone line when the power source external to the device does not have power available switching from a first processor to a second processor when the device enters the low power mode where the second processor uses less power than the first processor.

11. The method of claim 10 where the power source external to the device is an AC circuit.

12. The method of claim 10 where the device is a communication device for exchanging communications with a communication network from a plurality of user devices.

13. A method comprising:

powering a device, in a normal power mode, from a power source external to the device when the external source has power available;

powering the device, in a low power mode, from the power available in a phone line when the power source external to the device does not have power available disabling an interface when the device enters the low power mode where the interface is configured to exchange communications with a user device.

14. The method of claim 13 where the interface is a digital computer interface.

15. A method comprising:

powering a device, in a normal power mode, from a power source external to the device when the external source has power available;

powering the device, in a low power mode, from the power available in a phone line when the power source external to the device does not have power available switching a processor to a low power mode when the device enters the low power mode where the lower power mode is a slower clock rate.

16. A method comprising:

powering a device, in a normal power mode, from a power source external to the device when the external source has power available;

powering the device, in a low power mode, from the power available in a phone line when the power source external to the device does not have power available switching a network interface to a lower transmission rate when the device enters the low power mode.

17. The method of claim 16 where the network interface is a digital subscriber line interface.

* * * * *

UNITED STATES PATENT AND TRADEMARK OFFICE
CERTIFICATE OF CORRECTION

PATENT NO. : 6,880,093 B1
DATED : April 12, 2005
INVENTOR(S) : Joseph Bryan Lyles It is certified that error appears in the above-identified patent and that said Letters Patent is hereby corrected as shown below:

Column 6,
Line 48, replace "consumpiton of the device is lowered by witching" with
-- consumption of the device is lowered by switching --

Signed and Sealed this

Twenty-first Day of June, 2005

JON W. DUDAS
*Director of the United States Patent and Trademark Office*